United States Patent
Fan et al.

(10) Patent No.: US 7,546,006 B1
(45) Date of Patent: Jun. 9, 2009

(54) MULTI-PORT OPTICAL SWITCH AND METHOD OF ARRANGING THE SAME

(75) Inventors: Kuang-Chao Fan, Taipei (TW); Shou-Heng Chen, Keelung (TW); Tien-Tung Chung, Taipei (TW); Yao-Joe Yang, Taipei (TW)

(73) Assignee: National Taiwan University (TW)

( * ) Notice: Subject to any disclaimer, the term of this patent is extended or adjusted under 35 U.S.C. 154(b) by 0 days.

(21) Appl. No.: 12/101,253

(22) Filed: Apr. 11, 2008

(30) Foreign Application Priority Data

Feb. 15, 2008 (TW) ............................ 97105445 A

(51) Int. Cl.
*G02B 6/35* (2006.01)
*G02B 26/08* (2006.01)

(52) U.S. Cl. ..................................................... 385/18
(58) Field of Classification Search ............... 385/18
See application file for complete search history.

(56) References Cited

U.S. PATENT DOCUMENTS

| | | | |
|---|---|---|---|
| 4,815,827 A | 3/1989 | Lane | |
| 6,317,530 B1 * | 11/2001 | Ford | 385/17 |
| 6,408,113 B1 | 6/2002 | Wu et al. | |
| 6,424,759 B1 * | 7/2002 | Jing | 385/17 |
| 6,591,030 B2 | 7/2003 | Wang et al. | |
| 6,907,154 B2 | 6/2005 | Oikawa et al. | |

OTHER PUBLICATIONS

Waksman, Abraham, "A Permutation Network", Jan. 1968, Journam of the Association for Computing Machinery, vol. 15 No. 1, pp. 159-163.*

* cited by examiner

*Primary Examiner*—Jerry T Rahll
(74) *Attorney, Agent, or Firm*—Schmeiser, Olsen & Watts

(57) ABSTRACT

This invention relates to an optical switch with an arbitrary port number and its arrangement method for the optical communication system, and switches an optical path by using mirrors. The invention uses a network exchange algorithm to compute crossing points and reflecting points of the optical paths. Single-sided reflecting mirrors are disposed at the reflecting points of the optical path respectively, and double-sided reflecting mirrors are disposed at the crossing points of the optical path respectively. With the arrangement method, the arbitrary port number optical switch can be applied to satisfy the requirement for an arbitrary number of input and output terminals, so as to assure that an equal length of each optical path and to decrease the number of mirrors to minimize the cost, size and assembling time of the optical switch.

12 Claims, 7 Drawing Sheets

MULTI-PORT OPTICAL SWITCH AND METHOD OF ARRANGING THE SAME

FIELD OF THE INVENTION

The present invention relates to a multi-port optical switch and a method of arranging the multi-port optical switch for an optical communication system, and more particularly to a multi-port optical switch that uses mirrors to switch an optical path and a method of arranging the position of the mirrors.

BACKGROUND OF THE INVENTION

Optical switch is one of the major components of an all-optical network used for switching direct, cross or multi-party transmissions of optical signals in an optical fiber network system. In the optical switches widely used in the past, an inputted optical signal is converted into an electrical signal, and then the path of the electrical signal is switched, and finally the electrical signal is converted into an optical signal coupled to an optical fiber for its transmissions. Such method is not just complicated and power-consuming, but it is also unfavorable for promoting the development of the all-optical network system in the future.

Optical switches divided by the principle of operations into the following types: (1) mechanical optical switches such as prism, MEMS and moving fiber type optical switches, (2) electro-optic optical switches, (3) liquid crystal optical switches, (4) thermo-optic optical switches, (5) bubble optical switches, (6) magnetic optical switches, and (7) acousto-optic optical switches. Although there are various types of optical switches, yet most of the optical switches used in the all-optical network are mechanical optical switches, and these mechanical optical switch devices become the mainstream products in the optical communication market.

Mechanical optical switches use an actuator such as a comb drive, a relay, a motor or a cam to drive the MEMS, optical fiber (either moving fiber or fiber-to-fiber) or prism optical switches for switching an optical path, and the weight consists of 7% of MEMS optical switches, 9% of optical fiber optical switches and 84% of prism optical switches.

In general, 1×2, 1×4 and 2×2 optical switches having a number of input optical paths smaller than 2 are basic devices for switching an optical path in the field of optical communications. In an application of an optical switch that requires a plurality of input optical paths, a common combining method is adopted to achieve an optical switch with more input optical paths, but the optical switch provided for switching an optical path in accordance with such method drastically increases the overall cost, easily losses optical power, and simplifies the overall complexity of the equipment.

A traditional matrix 4×4 optical switch mirror architecture as shown in FIG. 1 comprises 16 reflecting mirrors, and each mirror comes with two modes of selectively passing and reflecting a light along an optical path by a binary switching mechanism, as well as guiding the incident light to a desired output optical path. The number of optical switches and reflecting mirrors of this traditional architecture increases drastically with an increase of input optical paths, and thus incurs a longer time for the installation and a higher cost for the switches. In addition, the length of each switched optical path of this traditional matrix architecture varies according to different combinations of input optical paths and output optical paths.

Although U.S. Pat. No. 6,907,154 adopts the installation of fixed mirrors and optical fiber to eliminate the difference of lengths for each optical path, yet the same issue of requiring much more reflecting mirrors for the increased number of input optical paths still exists.

In addition to traditional matrix switches, U.S. Pat. No. 4,815,827 uses two parallel single-sided mirrors to operate with a double-sided mirror for switching optical paths. As to the structural design, the required number of mirrors also increases greatly with an increase of incident optical paths.

To reduce the number of mirrors, a mirror arrangement of a traditional 4×4 optical switch as shown in FIG. 2 adopts a 4×4 Benes network architecture as shown in FIG. 3, wherein M1~M4 are double-sided reflecting mirrors, and R1~R8 are single-sided reflecting mirrors, and each mirror requires a binary switch mechanism, and the quantity of these mirrors is smaller than that of the traditional matrix switches. However, it is not the best method for the mirror arrangement, but simply a mirror arrangement for the 4×4 optical switches only.

U.S. Pat. No. 6,408,113 adopts two parallel single-sided mirrors and a plurality of double-sided mirrors for the mirror arrangement of a 4×4 optical switch, but such arrangement can be applied to the 4×4 optical switch only.

U.S. Pat. No. 6,591,030 adopts two parallel single-sided mirrors and a plurality of double-sided mirrors to achieve a multistage mirror arrangement of the optical switches, and the double-sided mirrors are installed according to the computing result obtained by an odd even merging algorithm of a Bayesian network. For an application of a 4×4 network architecture, the Bayesian odd even merging network can minimize the number of mirrors and optical switches theoretically, but the result is the same as the 4×4 Waksman network architecture as shown in FIG. 4. As increasingly more input optical paths are required in the industry, the Waksman network architecture can provide a method of using less movable double-sided mirrors. Furthermore, the number of input optical paths in the Bayesian odd even merging network can be an exponent of two only.

Therefore, it is an important subject for the invention to provide method for the mirror arrangement to expand the multi-port optical switches, such that the length of each switched optical path is equal, and the number of optical switches is reduced to minimize the manufacturing cost and the assembling time and meet the requirement for the arbitrary number of ports.

SUMMARY OF THE INVENTION

In view of the foregoing shortcomings of the prior art, the inventor of the present invention based on years of experience in the related field to conduct extensive researches and experiments, and finally developed a multi-port optical switch in accordance with the present invention to overcome the shortcomings of the prior art.

Therefore, it is a primary objective of the present invention to provide a multi-port optical switch that can flexibly increase the number of mirrors, and the multi-port optical switch comprises: a plurality of incident optical paths and a plurality of output optical paths; wherein the number of incident optical paths is equal or unequal to the number of output optical paths, and a plurality of crossing points and a plurality of reflecting points of the incident optical paths are produced by a network exchange architecture, and a plurality of double-sided reflecting mirrors are arranged in the mirror arranging area of the multi-port optical switch and disposed at positions corresponding to the crossing points, and a plurality of single-sided reflecting mirrors are arranged at positions corresponding to the reflecting points. The network exchange architecture is integrated with an arbitrary size Benes network architecture and a Waksman network architecture; and the incident optical paths passing through the mirror arranging area of the optical switch to the output optical paths have the same length of the optical path.

The present invention provides a method of arranging a multi-port optical switch that can increase the number of mirror flexibly, and the method comprises the steps of: arranging a mirror arranging area; arranging a plurality of incident optical paths on a side of the mirror arranging area, wherein the number of incident optical paths is a positive integer; arranging a plurality of output optical paths on another side of the mirror arranging area, wherein the number of output optical paths is equal or unequal to the number of incident optical paths; using a network exchange architecture to project the incident optical paths to produce a plurality of crossing points and a plurality of reflecting points; and assigning a double-sided reflecting mirror to a corresponding position of the crossing points and a single-sided reflecting mirror to the corresponding position of the reflecting points in the mirror arranging area.

The number of movable mirrors of an optical switch used in a network exchange architecture and the number of movable mirrors of an optical switch used in the prior art are compared, and the comparison results are listed in Table 1. In view of the results obtained from different numbers of incident optical paths and different methods, the number of the traditional matrix optical switches increases greatly with the increase of incident optical paths, and the number of mirrors required by a network exchange architecture of the present invention is very close to the required number of mirrors theoretically, and the increase is relatively mild when compared with the increase of other methods.

TABLE 1

| No. of Incident Optical Paths | Method | | | | |
|---|---|---|---|---|---|
| | Present Invention | Traditional Matrix | Benes Network | Bayesian odd even merging network | Arbitrary Size Waksman Network |
| 4 | 5 | 16 | 6 | 5 | 5 |
| 7 | 13 | 49 | Cannot be calculated | Cannot be calculated | 14 |
| 8 | 16 | 64 | 20 | 19 | 17 |
| 10 | 22 | 100 | Cannot be calculated | Cannot be calculated | 25 |
| 16 | 45 | 256 | 56 | 63 | 47 |
| 32 | 118 | 1024 | 144 | 191 | 129 |
| 64 | 296 | 4096 | 352 | 543 | 321 |

BRIEF DESCRIPTION OF THE DRAWINGS

FIG. 7b shows an arrangement of a preferred embodiment of the present invention made according to the positions of single-sided mirrors and double-sided mirrors corresponding to a network exchange architecture as depicted in FIG. 7a;

FIG. 9b shows an arrangement of a preferred embodiment of the present invention made according to the positions of single-sided mirrors and double-sided mirrors corresponding to a network exchange architecture as depicted in FIG. 9a;

DESCRIPTION OF THE PREFERRED EMBODIMENT

The above and other objects, features and advantages of the present invention will become apparent from the following detailed description taken with the accompanying drawing.

Figure 1:
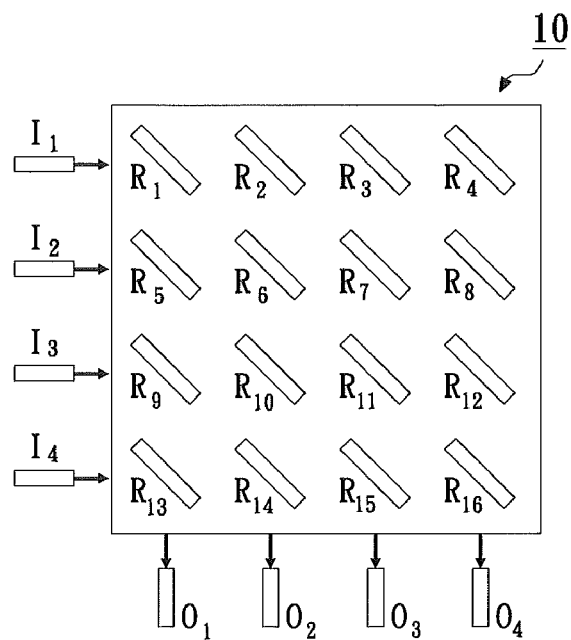
FIG. 1 shows a mirror arrangement of a traditional 4×4 matrix optical switch.
Figure 2:
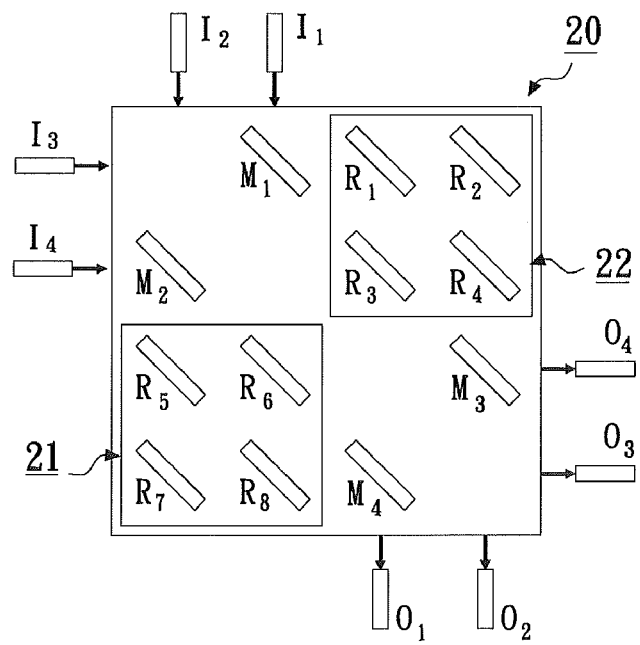
FIG. 2 shows a mirror arrangement of a traditional 4×4 optical switch.
Figure 3:
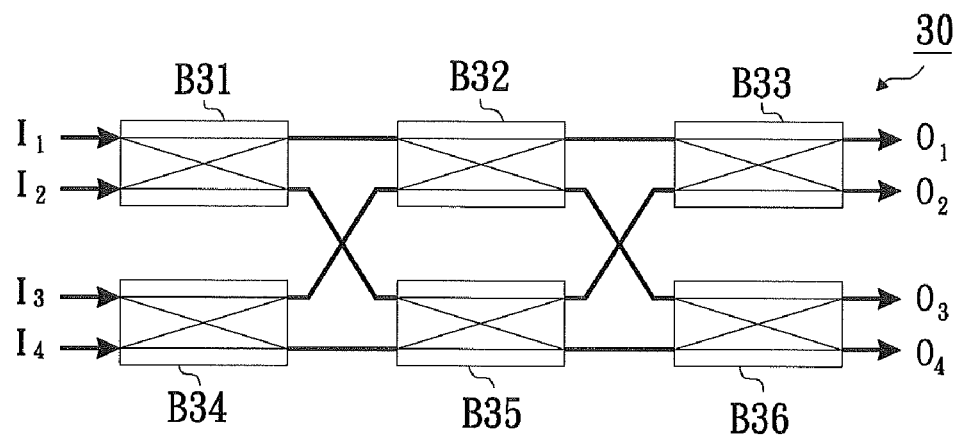
FIG. 3 shows a Benes 4×4 network exchange architecture.
Figure 4:
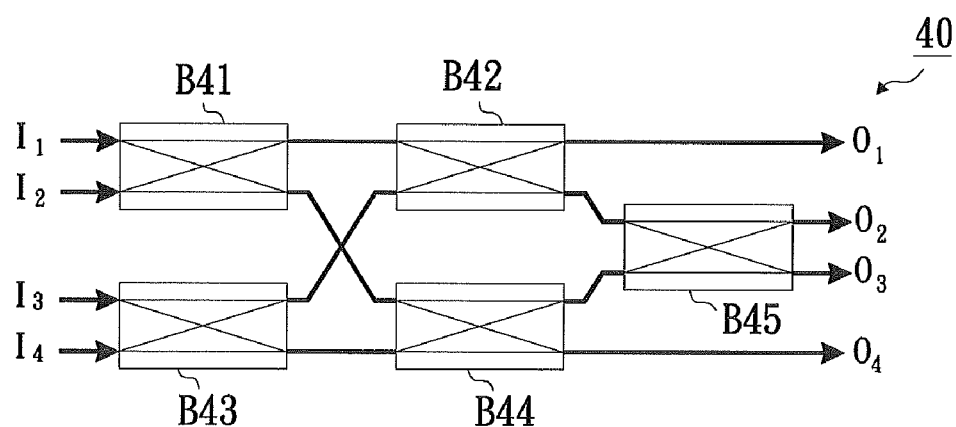
FIG. 4 shows a Waksman 4×4 network exchange architecture.
Figure 5:
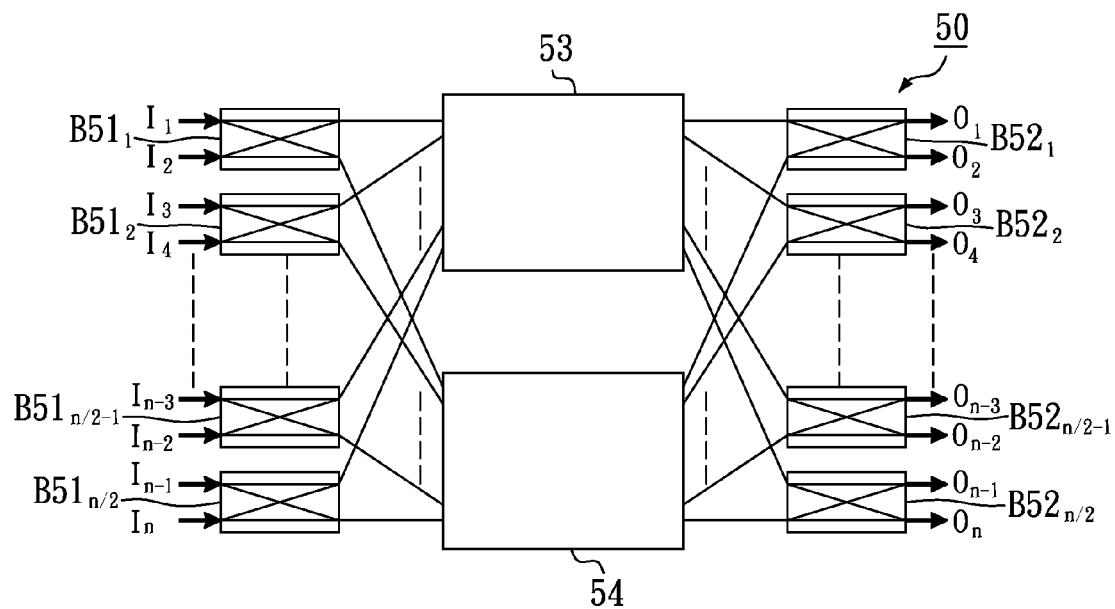
FIG. 5 shows an even-input arbitrary size Waksman network exchange architecture.

Referring to FIG. 5 for an even-input optical path network exchange architecture required by the mirror arrangement of the present invention, 50 shows an even-input arbitrary size Waksman network exchange architecture. If the number of input optical paths is an even number n, the incident optical paths I1~In will be outputted from two optical paths respectively through the binary optical switches B511~B51$n$/2, wherein one of the incident optical paths is inputted to an upper N/2×N/2 optical switch 53, and the other incident optical path is inputted to a lower N/2×N/2 optical switch 54, and the outputs of the lower optical switch 53, 54 are outputted to the output optical paths O1~On through the binary optical switches B521~B52$n$/2 respectively.

Figure 6:
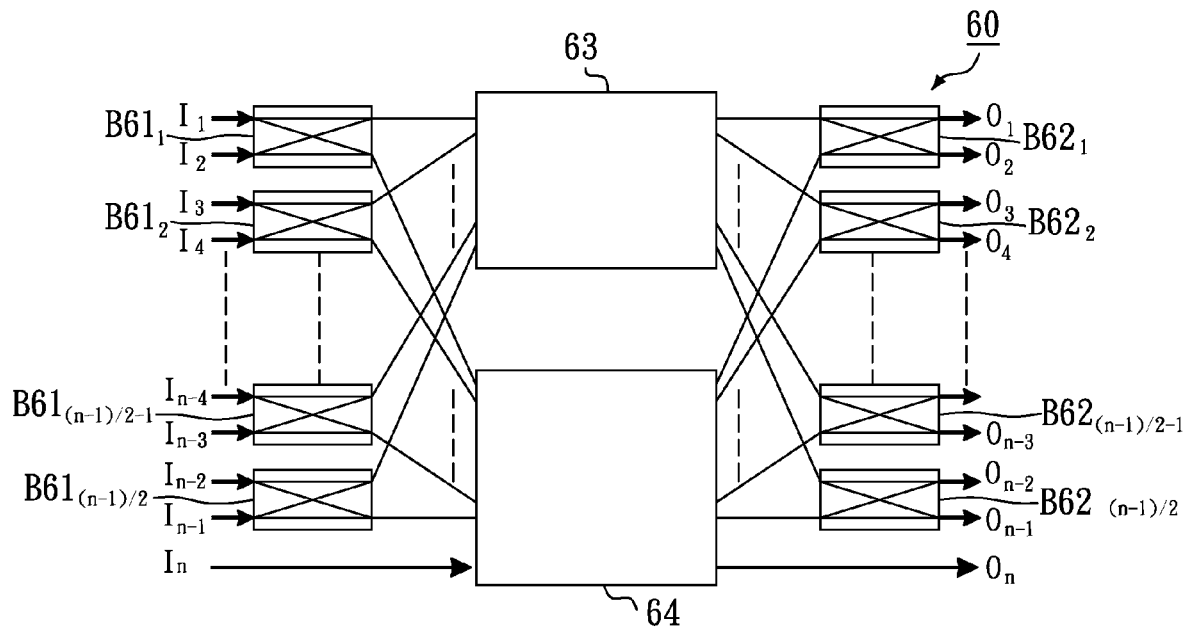
FIG. 6 shows an odd-input arbitrary size Waksman network exchange architecture.

Referring to FIG. 6 for an odd-input optical path network exchange architecture required by the mirror arrangement of the present invention, 60 shows an odd-input arbitrary size Waksman network exchange architecture. If the number of input optical paths is an odd number n, the incident optical paths I1~In−1 are outputted to two optical paths through the binary optical switches B611~B61($n$−1)/2 respectively, wherein one of the optical paths is outputted to an upper (N−1)/2×(N−1)/2 optical switch 63, and the other optical path is inputted to a lower (N+1)/2×(N+1)/2 optical switch 64, and the input path In is inputted directly to the lower optical switch, and the outputs of the upper and lower optical switches O1~On−1 are outputted to the output optical paths 63, 64 through the optical switches B611~B62($n$−1)/2 respectively. The output optical path On is outputted directly from the lower optical switch 64.

Referring to FIG. 7 for an odd network exchange architecture with a minimum number of input optical paths, 70$a$ shows a 3×3 arbitrary size Waksman network exchange architecture. The incident optical paths I1~I3 are outputted to the output optical paths O1~O3 after passing through the binary optical switches B71~B73.

Figure 7A:
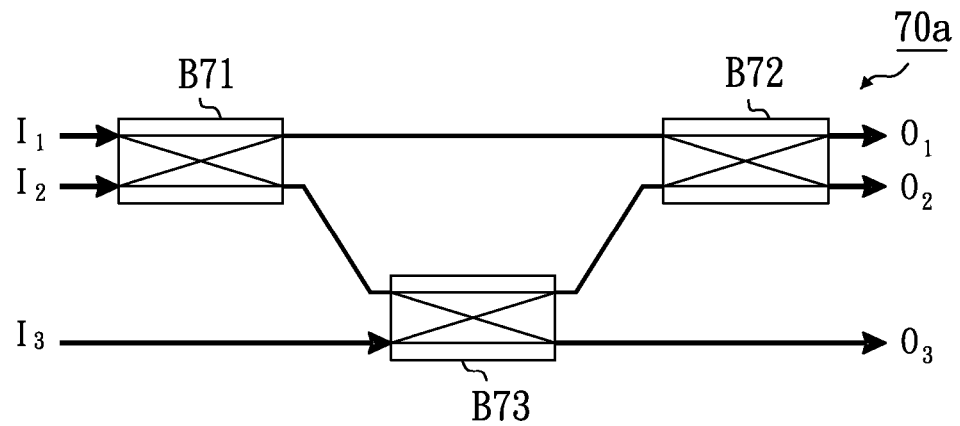
FIG. 7a shows a 3×3 arbitrary size Waksman network exchange architecture.
Figure 7B:
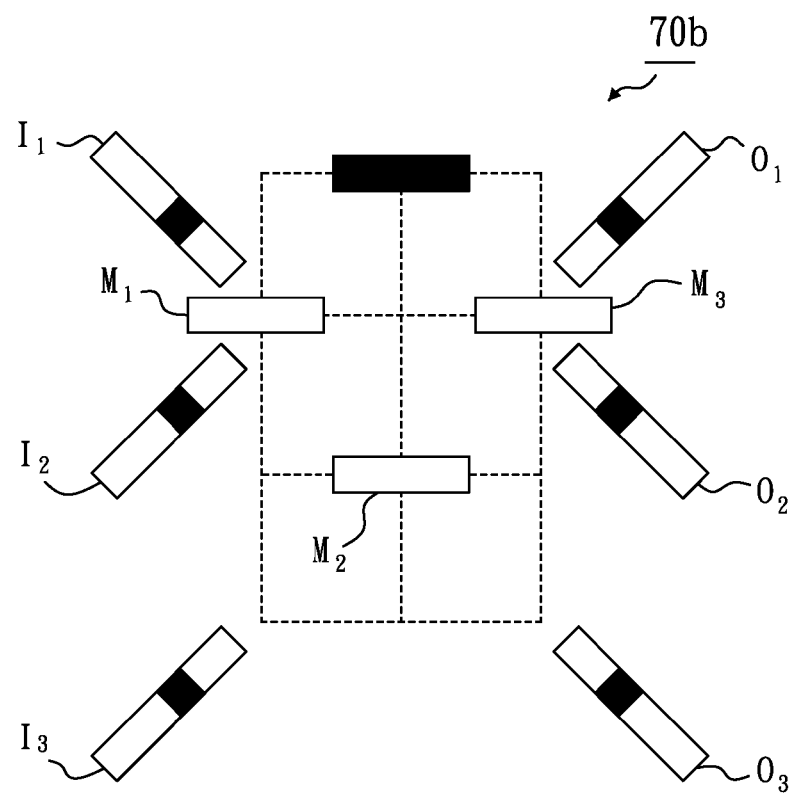

FIG. 7b shows a mirror arrangement of a 3×3 mirror reflecting optical switch 70b in accordance with a preferred embodiment of the present invention. The double-sided mirrors M1~M3 are installed in the mirror arranging area and disposed at positions corresponding to the network exchange architecture as shown in FIG. 7a, and a double-sided mirror is arranged at the crossing point of the optical paths. The double-sided mirrors can change their positions, such that the incident light can be selectively passed through and reflected to achieve the effect of making the number of incident optical paths equal or unequal to the number of output optical paths.

Figure 9A:
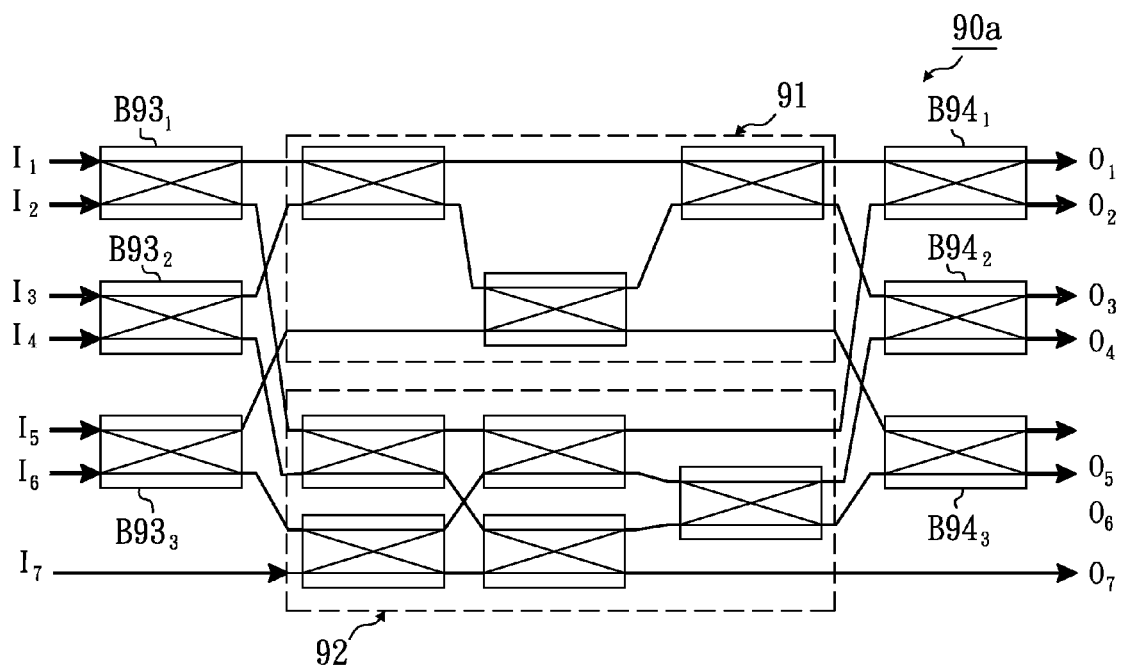
FIG. 9a shows a 7×7 arbitrary size Waksman network exchange architecture.
Figure 9B:
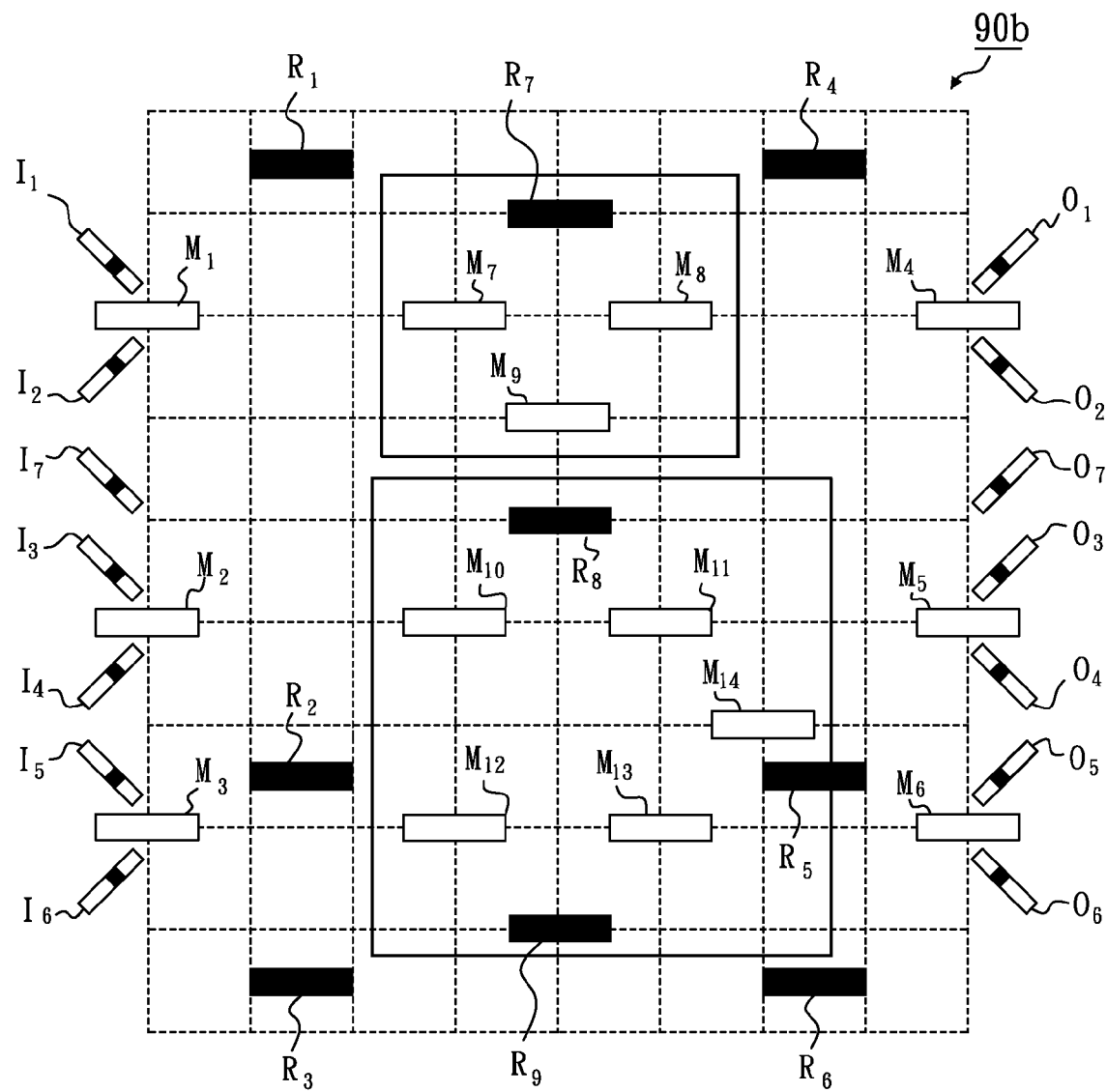

The single-sided mirror R1 installed in mirror arranging area remains still, so that the incident optical path can comply with the network exchange architecture as shown in FIG. 9b, and a single-sided mirror is arranged at a reflecting point of the optical path. The optical switch in accordance with this embodiment is controlled by switching the positions of the double-sided mirrors M~M3 to meet the requirement of switching a combination of optical paths, and achieve the effect of making the number of incident optical paths equal or unequal to the number of output optical paths. The incident optical paths I1~I3 and the output optical paths O1~O3 are disposed on both sides of a mirror arranging area and symmetrically with respect to an axis along the center of the mirror arranging area, and the optical paths of all incident lights passing through the mirror arranging area to the output light have the same length.

Figure 8:
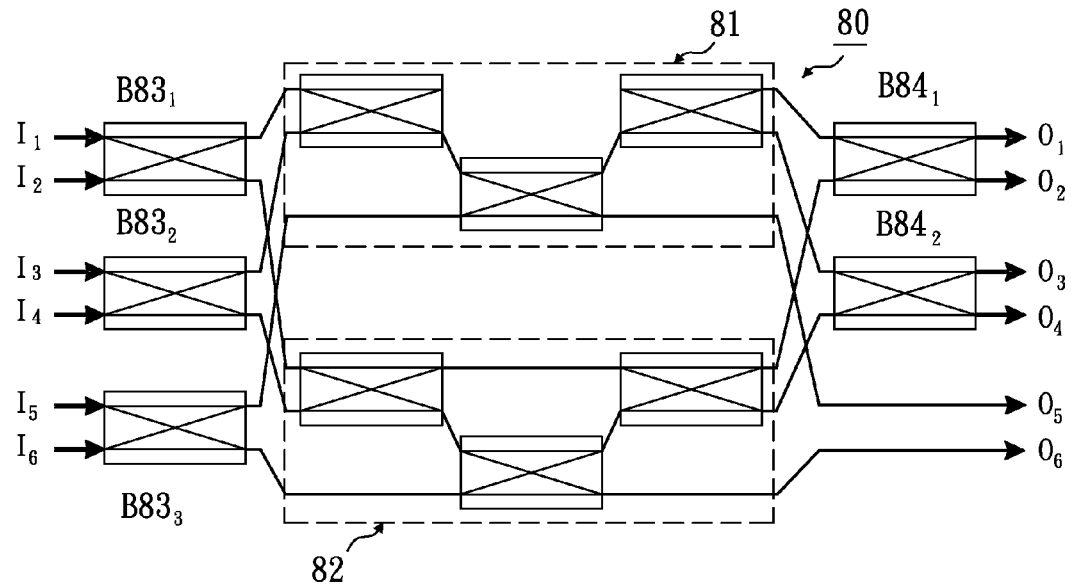
FIG. 8 shows a 6×6 arbitrary size Waks man network exchange architecture.

Referring to FIG. 8 for a 6×6 network exchange architecture, 80 shows a 6×6 arbitrary size Waksman network exchange architecture. The number of incident optical paths is six (which is an even number), and the incident optical paths I1~I6 are outputted from the binary optical switches B831~B833 to two optical paths, wherein one of the optical paths is outputted to an upper binary optical switch group 81, and another optical path is inputted to a lower binary optical switch group 82, and the outputs of the upper and lower binary optical switch groups 81, 82 are passed through the binary optical switches B841~B843 and outputted to the output optical paths O1~O6.

Referring to FIG. 9a for a 7×7 network exchange architecture, 90a shows a 7×7 arbitrary size Waksman network exchange architecture. The number of incident optical paths is seven (which is an odd number), and the incident optical paths I1~I6 outputs two optical paths through the binary optical switches B931~B933 respectively, and one of the incident optical paths is inputted to an upper binary optical switch group 91, and another optical path is inputted directly to a lower binary optical switch group 92, and the input optical path 17 is inputted directly to the lower binary optical switch group 92; and the outputs of the upper and lower binary optical switch groups 91, 92 are passed through the binary optical switches B941~B943 and outputted to the output optical paths O1~O6, and the output optical path O7 is outputted directly from the lower binary optical switch group 92.

Referring to FIG. 9b for a mirror arrangement optical switch 90b of a 7×7 reflecting mirror in accordance with a preferred embodiment of the present invention, a plurality of double-sided mirrors M1~M14 are installed in the middle of the mirror arranging area and disposed at a position corresponding to a network exchange architecture as shown in FIG. 9a, and a double-sided mirror is arranged at the crossing point of the optical path. The double-sided mirror can pass or reflect the incident light by changing its position, such that the number of incident optical paths is equal or unequal to the number of output optical paths. The single-sided mirrors R1~R9 are installed in the mirror arranging area and remain still, so that the incident optical paths comply with the network exchange architecture as shown in FIG. 9b, and a single-sided mirror is arranged at the reflecting point of the optical path. The optical switch of this embodiment controls the switching position by the double-sided mirrors M1~M14 to meet the requirement of switching various different combinations of optical paths and achieve the effect of having the number of incident optical paths equal or unequal to the number of output optical paths. The incident optical paths I1~I7 and the output optical paths O1~O7 on both sides of the mirror arranging area use the middle of the mirror arranging area as an axis for a symmetric arrangement, so that all incident lights passing through the mirror arranging area to the output light have equal optical paths, wherein the single-sided mirror R7 and the double-sided mirrors M7~M9 in accordance with the preferred embodiment as shown in FIG. 7b have the same mirror arrangement for an optical switch 70b of a 3×3 reflecting mirror.

Figure 10:
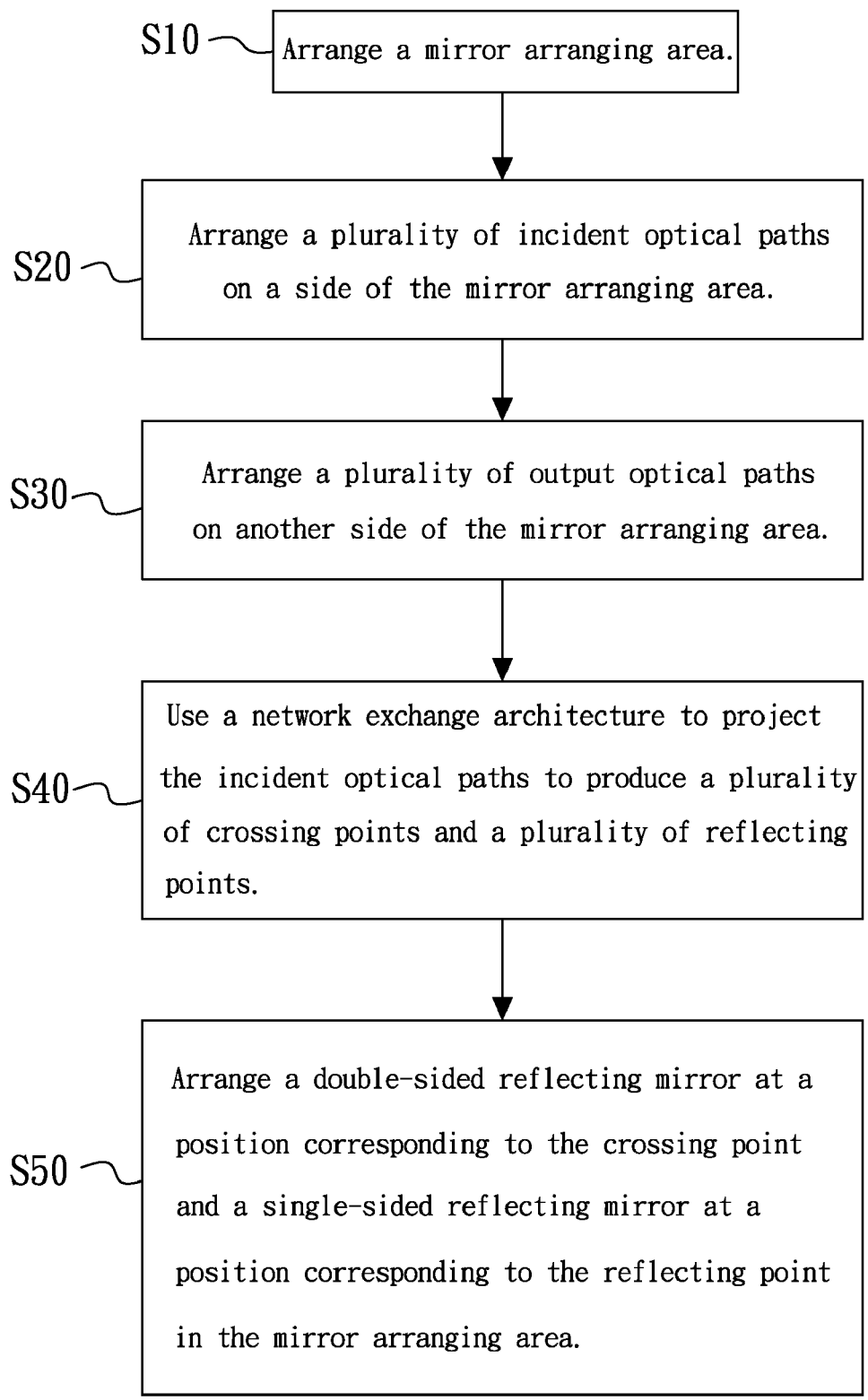
FIG. 10 is a flow chart of an arrangement method in accordance with a preferred embodiment of the present invention.

Referring to FIG. 10 for a flow chart of an arrangement method in accordance with a preferred embodiment of the present invention, the method comprises the steps of: arranging a mirror arranging area (S10); arranging a plurality of incident optical paths on a side of the mirror arranging area (S20), wherein the number of incident optical paths is a positive integer; arranging a plurality of output optical paths on another side of the mirror arranging area (S30), wherein the number of output optical paths is a positive integer, and the number of output optical paths is equal or unequal to the number of incident optical paths; using a network exchange architecture to project the incident optical paths to produce a plurality of crossing points and a plurality of reflecting points (S40); and arranging a double-sided reflecting mirror at a position corresponding to the crossing point and a single-sided reflecting mirror at a position corresponding to the reflecting point in the mirror arranging area (S50), wherein the network exchange architecture is integrated with a Benes network architecture and a Waksman network architecture, and the incident optical paths passing through the mirror arranging area to the output optical paths have an equal length of the switched optical path.

Therefore, the optical switch and its arrangement method of the present invention can use a network exchange architecture to arrange the position of a double-sided mirror, and then arrange the position of a single-sided minor, such that the optical paths comply with the corresponding network exchange architecture to develop an arbitrary size optical switch, and achieve the effects of reducing the number of mirrors and giving equal length for each switched optical path.

While the invention has been described by means of specific embodiments, numerous modifications and variations could be made thereto by those skilled in the art without departing from the scope and spirit of the invention set forth in the claims.

What is claimed is:

1. A multi-port optical switch, comprising:
    a mirror arranging area;
    a plurality of incident optical paths, disposed on a side of said mirror arranging area;
    a plurality of output optical paths, disposed on another side of said mirror arranging area;
    at least one double-sided reflecting mirror, disposed in said mirror arranging area, and said double-sided reflecting mirror being arranged at a position of a crossing point of a plurality of optical paths projected from a network exchange architecture, wherein the network exchange architecture is integrated with both a Benes network architecture and a Waksman network architecture; and
    at least one single-sided reflecting mirror, disposed in said mirror arranging area, and said single-sided reflecting mirror being arranged at a position of a reflecting point of a plurality of optical paths projected from the network exchange architecture.

2. The multi-port optical switch of claim 1, wherein said incident optical paths passing through said mirror arranging area to said output optical paths respectively have the same length of a switched optical path.

3. A method of installing a multi-port optical switch, comprising the steps of:
   arranging a mirror arranging area;
   arranging a plurality of incident optical paths being equal to a positive integer;
   arranging a plurality of output optical paths on another side of said mirror arranging area, and the number of said output optical paths being a positive integer unequal to the number of said incident optical paths;
   using a network exchange architecture to project said incident optical paths and produce a plurality of crossing points and a plurality of reflecting points, the network exchange architecture being integrated as a combination of both a Benes network architecture and a Waksman network architecture; and
   arranging a double-sided reflecting mirror at a position corresponding to said crossing point and a single-sided reflecting mirror at a position corresponding to said reflecting points in said mirror arranging area.

4. The method of installing a multi-port optical switch of claim 3, wherein said incident optical paths passing through said mirror arranging area to said output optical paths respectively have the same length of a switched optical path.

5. A multi-port optical switch, comprising:
   a mirror arranging area;
   a plurality of incident optical paths, disposed on a side of said mirror arranging area, and the number of said incident optical paths being a positive integer;
   a plurality of output optical paths, disposed on another side of said mirror arranging area, and the number of said output optical paths being equal to the number of said incident optical paths;
   at least one double-sided reflecting mirror, disposed in said mirror arranging area, and said double-sided reflecting mirror being arranged at a position of a crossing point of a plurality of optical paths projected from a network exchange architecture, wherein the network exchange architecture is integrated with both a Benes network architecture and a Waksman network architecture; and
   at least one single-sided reflecting mirror, disposed in said mirror arranging area, and said single-sided reflecting mirror being disposed at a position of a reflecting point of a plurality of optical paths projected from the network exchange architecture.

6. The multi-port optical switch of claim 1, wherein said incident optical paths passing through said mirror arranging area to said output optical paths respectively have the same length of a switched optical path.

7. A multi-port optical switch, comprising:
   a mirror arranging area;
   a plurality of incident optical paths, disposed on a side of said mirror arranging area, and the number of said incident optical paths being equal to a positive integer;
   a plurality of output optical paths, disposed on another side of said mirror arranging area, and the number of said output optical paths being a positive integer unequal to the number of said incident optical paths;
   at least one double-sided reflecting mirror, disposed in said mirror arranging area, and said double-sided reflecting mirror being arranged at a position of a crossing point of a plurality of optical paths projected from a network exchange architecture, wherein the network exchange architecture is integrated with both a Benes network architecture and a Waksman network architecture; and
   at least one single-sided reflecting mirror, disposed in said mirror arranging area, and said single-sided reflecting mirror being arranged at a position of a reflecting point of said plurality of optical paths.

8. The multi-port optical switch of claim 7, wherein said incident optical paths passing through said mirror arranging area to said output optical paths respectively have the same length of a switched optical path.

9. A method of installing a multi-port optical switch, comprising the steps of:
   arranging a mirror arranging area;
   arranging a plurality of incident optical paths on a side of said mirror arranging area, and the number of said incident optical paths being equal to a positive integer;
   arranging a plurality of output optical paths on another side of said mirror arranging area, and the number of said output optical paths being equal to the number of said incident optical paths;
   using a network exchange architecture to project said incident optical paths and produce a plurality of crossing points and a plurality of reflecting points, the network exchange architecture being integrated as a combination of both a Benes network architecture and a Waksman network architecture; and
   arranging a double-sided reflecting mirror at a position corresponding to said crossing point and a single sided reflecting mirror at a position corresponding to said reflecting points in said mirror arranging area.

10. The method of installing a multi-port optical switch of claim 9, wherein said incidental optical paths passing through said mirror arranging area to said output optical paths have the same length of a switched optical path.

11. The method of installing a multi-port optical switch, comprising the steps of:
   arranging a mirror arranging area;
   arranging a plurality of incident optical paths on a side of said mirror arranging area;
   arranging a plurality of output optical paths on another side of said mirror arranging area;
   using a network exchange architecture to project said incident optical paths and produce a plurality of crossing points and a plurality of reflecting points, the network exchange architecture being integrated as a combination of both a Benes network architecture and a Waksman network architecture; and
   arranging a double-sided reflecting mirror at a position corresponding to said crossing point and a single-sided reflecting mirror at a position corresponding to said reflecting points in said mirror arranging area.

12. The method of installing a multi-port optical switch of claim 11, wherein said incident optical paths passing through said mirror arranging area to said output optical paths respectively have the same length or a switched optical path.

* * * * *